US009514507B2

(12) United States Patent
McKenzie et al.

(10) Patent No.: US 9,514,507 B2
(45) Date of Patent: Dec. 6, 2016

(54) METHODS AND SYSTEMS FOR MAINTAINING STATE IN A VIRTUAL MACHINE WHEN DISCONNECTED FROM GRAPHICS HARDWARE

(71) Applicant: Citrix Systems, Inc., Fort Lauderdale, FL (US)

(72) Inventors: James McKenzie, Cambridge (GB); Jean Guyader, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 535 days.

(21) Appl. No.: 13/687,623

(22) Filed: Nov. 28, 2012

(65) Prior Publication Data

US 2013/0155083 A1    Jun. 20, 2013

Related U.S. Application Data

(60) Provisional application No. 61/564,692, filed on Nov. 29, 2011.

(51) Int. Cl.
| | |
|---|---|
| *G06F 15/16* | (2006.01) |
| *G06F 15/00* | (2006.01) |
| *G06T 1/00* | (2006.01) |
| *G06T 1/20* | (2006.01) |
| *G06F 9/455* | (2006.01) |

(52) U.S. Cl.
CPC .............. *G06T 1/20* (2013.01); *G06F 9/455* (2013.01); *G06F 9/45558* (2013.01)

(58) Field of Classification Search
CPC ................. G06F 15/00; G06F 15/16–15/161; G06T 1/00–1/0092; G06T 1/60; G06T 15/00–15/005; G09G 5/39
USPC ............. 345/501, 502, 522, 530, 531; 718/1
See application file for complete search history.

(56) References Cited

U.S. PATENT DOCUMENTS

| | | | |
|---|---|---|---|
| 2007/0169121 A1* | 7/2007 | Hunt et al. ................... | 718/1 |
| 2008/0077917 A1* | 3/2008 | Chen et al. ................... | 718/1 |
| 2010/0199276 A1* | 8/2010 | Umbehocker ................ | 718/1 |
| 2011/0084973 A1* | 4/2011 | Masood ...................... | 345/506 |
| 2011/0302577 A1* | 12/2011 | Reuther et al. .............. | 718/1 |

* cited by examiner

*Primary Examiner* — Jacinta M Crawford
(74) *Attorney, Agent, or Firm* — Foley and Lardner LLP; John D. Lanza

(57) ABSTRACT

The present disclosure is directed towards methods and systems for maintaining state in a virtual machine when disconnected from graphics hardware. The virtual machine is one of a plurality of virtual machines hosted by a hypervisor executing on a computing device. A control virtual machine may be hosted by a hypervisor executing on a computing device. The control virtual machine may store state information of a graphics processing unit (GPU) of the computing device. The GPU may render an image from a first virtual machine. The control virtual machine may remove, from the first virtual machine, access to the GPU. The control virtual machine may redirect the first virtual machine to a GPU emulation program. The GPU emulation program may render the image from the first virtual machine using at least a portion of the stored state information.

20 Claims, 7 Drawing Sheets

METHODS AND SYSTEMS FOR MAINTAINING STATE IN A VIRTUAL MACHINE WHEN DISCONNECTED FROM GRAPHICS HARDWARE

RELATED APPLICATIONS

This present application claims the benefit of and priority to: U.S. Provisional Patent Application No. 61/564,692 entitled "METHODS AND SYSTEMS FOR MAINTAINING STATE IN A VIRTUAL MACHINE WHEN DISCONNECTED FROM GRAPHICS HARDWARE," filed Nov. 29, 2011, which is incorporated by reference in its entirety.

FIELD OF THE DISCLOSURE

The methods and systems described herein relate generally to managing resources for virtual machines. In particular, the methods and systems relate to re-assignment of graphics hardware between virtual machines.

BACKGROUND OF THE DISCLOSURE

In virtualization environments, a hypervisor may map various hardware on a host machine to a virtual machine. Unlike other hardware resources, such as multi-core processors and disk storage which can be partitioned, graphics hardware such as a graphics processing unit (GPU) may not be easily allocated to multiple virtual machine. In a multi-virtual-machine environment, the hypervisor may allow only one virtual machine or guest operating system (OS) to access a GPU at a time, in order to support hardware acceleration or to avoid conflicts in processing concurrent graphical instructions from multiple sources (i.e., virtual machines). Moreover, re-assignment of a GPU between virtual machines may impair user experience, such as where a guest OS may generate an alert or error in response to the loss of the GPU by the guest OS.

BRIEF SUMMARY OF THE DISCLOSURE

Described herein are methods and systems for maintaining state in a virtual machine when disconnected from graphics hardware. The present systems and methods recognize that host resources, such as graphics hardware, may be limited, and provides the ability for such resources to be managed across one or more virtual machines while avoiding significant degradation in user experience. For example, a user may want to redirect focus from a first virtual machine to a new virtual machine, the first virtual machine allocated with the host machine's graphics hardware. In re-assigning the graphics hardware from the first virtual machine to the other virtual machine, a control virtual machine may pause execution of the first virtual machine and save state information related to graphics processing. The control virtual machine may seamlessly replace the graphics hardware with an emulator for handling memory accesses and interrupts with respect to the first virtual machine. The emulator may maintain interactions with the first virtual machine and may further output or maintain a graphical image for the first virtual machine while second virtual machine utilizes the graphic hardware. When the first virtual machine receives focus, the graphics hardware may be re-allocated back to the virtual machine, and may resume graphical processing in place of the emulator.

In one aspect, the present disclosure is related to a method for maintaining state in a virtual machine when disconnected from graphics hardware. The virtual machine is one of a plurality of virtual machines hosted by a hypervisor executing on a computing device. A control virtual machine may be hosted by a hypervisor executing on a computing device. The control virtual machine may store state information of a graphics processing unit (GPU) of the computing device. The GPU may render an image from a first virtual machine. The control virtual machine may remove, from the first virtual machine, access to the GPU. The control virtual machine may redirect the first virtual machine to a GPU emulation program. The GPU emulation program may render the image from the first virtual machine using at least a portion of the stored state information.

In some embodiments, the control virtual machine stores state information of the GPU to a buffer of the computing device. The control virtual machine may copy at least a portion of a graphics stack of the GPU including a state of a graphics driver. The control virtual machine may determine that the GPU emulation program is available within the first virtual machine for execution. The control virtual machine may determine that the GPU emulation program is installed in the computing device. The control virtual machine may execute the GPU emulation program prior to removing access to the GPU.

In some embodiments, the control virtual machine provides the first virtual machine with uninterrupted or substantially uninterrupted access to a graphics processing entity during the removal and redirection. The control virtual machine may redirect an application of the first virtual machine providing the image to the GPU emulation program. The control virtual machine may provide, to a second virtual machine, access to the GPU responsive to the removal. In certain embodiments, the control virtual machine may restoring the stored state information to the GPU and redirecting the first virtual machine to the GPU.

In another aspect, the present disclosure is related to a system for maintaining state in a virtual machine when disconnected from graphics hardware. The virtual machine is one of a plurality of virtual machines hosted by a hypervisor executing on a computing device. The system may include a hypervisor executing on a computing device. The hypervisor may host a control virtual machine and a first virtual machine. The control virtual machine may be configured to store state information of a graphics processing unit (GPU) of the computing device. The GPU may render an image from a first virtual machine. The control virtual machine may remove, from the first virtual machine, access to the GPU. The control virtual machine may redirect the first virtual machine to a GPU emulation program. The GPU emulation program may render the image from the first virtual machine using at least a portion of the stored state information.

In some embodiments, the control virtual machine stores state information of the GPU to a buffer of the computing device. The control virtual machine may copy at least a portion of a graphics stack of the GPU including a state of a graphics driver. The control virtual machine may determine that the GPU emulation program is available within the first virtual machine for execution. The control virtual machine may determine that the GPU emulation program is installed in the computing device. The control virtual machine may initiate execution of the GPU emulation program prior to removing access to the GPU.

In some embodiments, the control virtual machine provides the first virtual machine with uninterrupted or substantially uninterrupted access to a graphics processing entity during the removal and redirection. The control virtual machine may redirect an application of the first virtual machine providing the image to the GPU emulation program. In certain embodiments, the control virtual machine may provide, to a second virtual machine, access to the GPU responsive to the removal. The control virtual machine may restore the stored state information to the GPU and redirects the first virtual machine to the GPU.

The details of various embodiments of the invention are set forth in the accompanying drawings and the description below.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
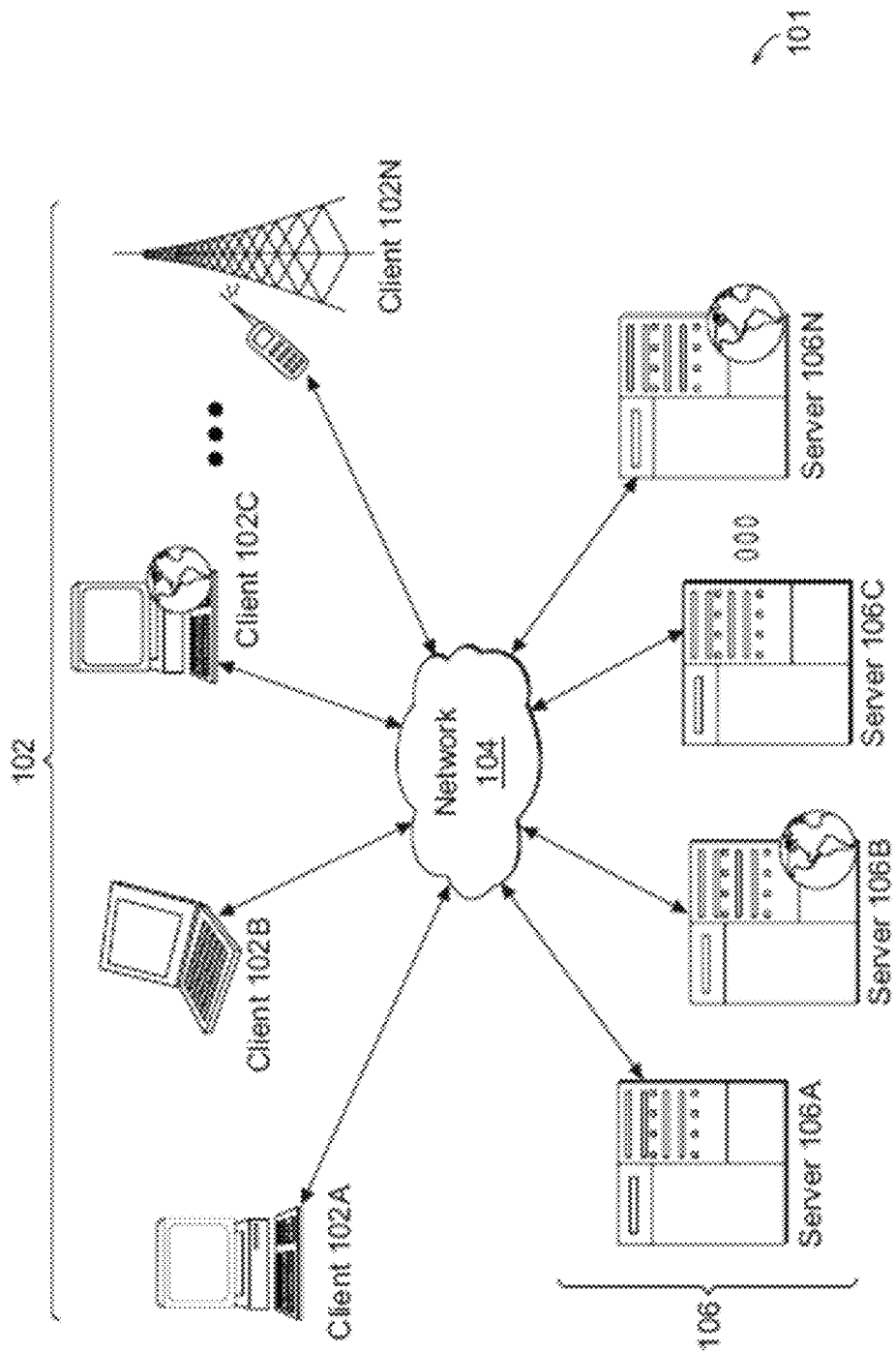
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems including a virtualization environment which may be useful for practicing embodiments described herein; and Section C describes embodiments of systems and for maintaining state in a virtual machine when disconnected from graphics hardware.

A. Network and Computing Environment

Referring now to FIG. 1A, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a local machine 102 has the capacity to function as both a client node seeking access to resources provided by a server and as a server providing access to hosted resources for other clients 102a-102n.

Although FIG. 1A shows a network 104 between the local machines 102 and the remote machines 106, the local machines 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm. In another of these embodiments, the remote machines 106 may be geographically dispersed. In other embodiments, a server farm may be administered as a single entity. In still other embodiments, the server farm comprises a plurality of server farms. The remote machines 106 within each server farm can be heterogeneous—one or more of the remote machines 106 can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 106 can operate on according to another type of operating system platform (e.g., Unix or Linux).

The remote machines 106 of each server farm do not need to be physically proximate to another remote machine 106 in the same server farm. Thus, the group of remote machines 106 logically grouped as a server farm may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a local machine 102. In other embodiments, a remote machine 106 executes a virtual machine, which provides an execution session within which applications execute on behalf of a user of a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 102 communicates with a remote machine 106. In one embodiment, the local machine 102 communicates directly with one of the remote machines 106 in a server farm 38. In another embodiment, the local machine 102 executes a program neighborhood application to communicate with a remote machine 106 in a server farm 38. In still another embodiment, the remote machine 106 provides the functionality of a master node. In some embodiments, the local machine 102 communicates with the remote machine 106 in the server farm 38 through a network 104. Over the network 104, the local machine 102 can, for example, request execution of various applications hosted by the remote machines 106a-106n in the server farm 38 and receive output of the results of the application execution for display. In some embodiments, only a master node provides the functionality required to identify and provide address information associated with a remote machine 106b hosting a requested application.

In one embodiment, the remote machine 106 provides the functionality of a web server. In another embodiment, the remote machine 106a receives requests from the local machine 102, forwards the requests to a second remote machine 106b and responds to the request by the local machine 102 with a response to the request from the remote machine 106b. In still another embodiment, the remote machine 106a acquires an enumeration of applications available to the local machine 102 and address information associated with a remote machine 106b hosting an application identified by the enumeration of applications. In yet another embodiment, the remote machine 106 presents the response to the request to the local machine 102 using a web interface. In one embodiment, the local machine 102 communicates directly with the remote machine 106 to access the identified application. In another embodiment, the local machine 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 102. In some embodiments, the application may be a server-based or a remote-based application executed on behalf of the local machine 102 on a remote machine 106. In other embodiments, the remote machine 106 may display output to the local machine 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

Figure 1B:
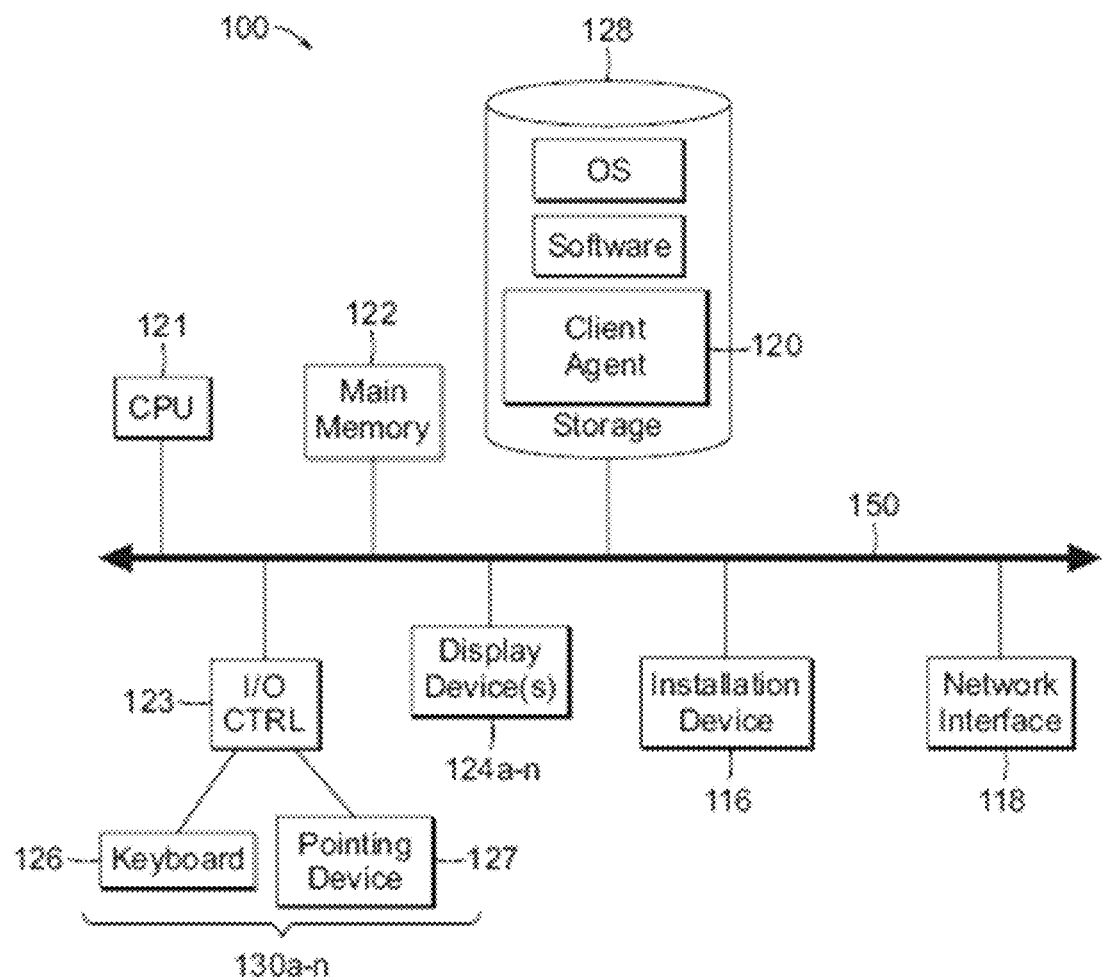
FIGS. 1B-1C are block diagrams depicting embodiments of computers useful in connection with the methods and systems described herein.
Figure 1C:
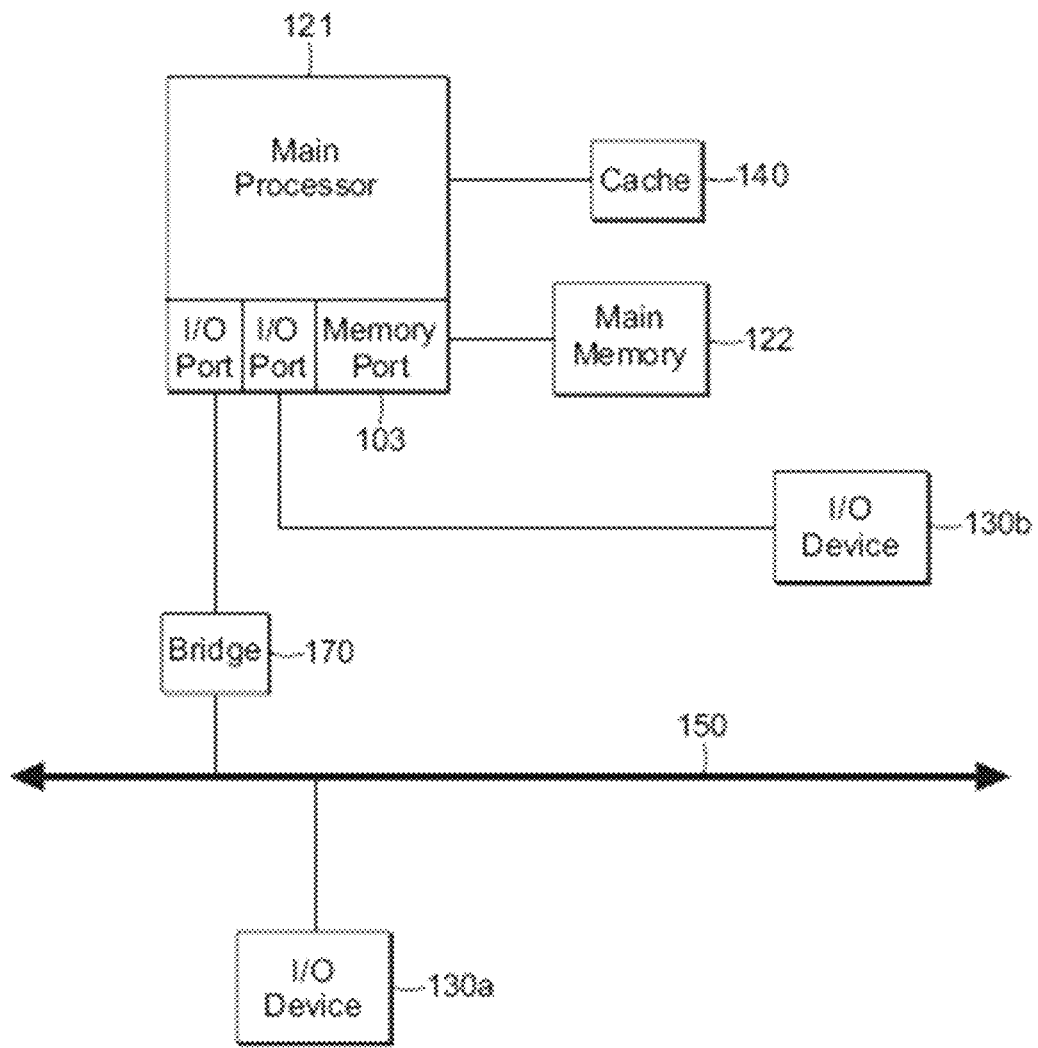

The local machine 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the local machine 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. An I/O controller 123, as shown in FIG. 1B, may control the I/O devices. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In one embodiment, a resource may be a program, an application, a document, a file, a plurality of applications, a plurality of files, an executable program file, a desktop environment, a computing environment, or other resource made available to a user of the local computing device 102. The resource may be delivered to the local computing device 102 via a plurality of access methods including, but not limited to, conventional installation directly on the local computing device 102, delivery to the local computing device 102 via a method for application streaming, delivery to the local computing device 102 of output data generated by an execution of the resource on a third computing device 106b and communicated to the local computing device 102 via a presentation layer protocol, delivery to the local computing device 102 of output data generated by an execution of the resource via a virtual machine executing on a remote computing device 106, or execution from a removable storage device connected to the local computing device 102, such as a USB device, or via a virtual machine executing on the local computing device 102 and generating output data. In some embodiments, the local computing device 102 transmits output data generated by the execution of the resource to another client computing device 102b.

In some embodiments, a user of a local computing device 102 connects to a remote computing device 106 and views a display on the local computing device 102 of a local version of a remote desktop environment, comprising a plurality of data objects, generated on the remote computing device 106. In one of these embodiments, at least one resource is provided to the user by the remote computing device 106 (or by a second remote computing device 106b) and displayed in the remote desktop environment. However, there may be resources that the user executes on the local computing device 102, either by choice, or due to a policy or technological requirement. In another of these embodiments, the user of the local computing device 102 would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In still another of these embodiments, requests for execution of a resource, windowing moves, application minimize/maximize, resizing windows, and termination of executing resources may be controlled by interacting with a remote desktop environment that integrates the display of the remote resources and of the local resources. In yet another of these embodiments, an application or other resource accessible via an integrated desktop environment—including those resources executed on the local computing device 102 and those executed on the remote computing device 106—is shown in a single desktop environment.

In one embodiment, data objects from a remote computing device 106 are integrated into a desktop environment generated by the local computing device 102. In another embodiment, the remote computing device 106 maintains the integrated desktop. In still another embodiment, the local computing device 102 maintains the integrated desktop.

In some embodiments, a single remote desktop environment 204 is displayed. In one of these embodiments, the remote desktop environment 204 is displayed as a full-screen desktop. In other embodiments, a plurality of remote desktop environments 204 is displayed. In one of these embodiments, one or more of the remote desktop environments are displayed in non-full-screen mode on one or more display devices 124. In another of these embodiments, the remote desktop environments are displayed in full-screen mode on individual display devices. In still another of these embodiments, one or more of the remote desktop environments are displayed in full-screen mode on one or more display devices 124.

B. Systems Including Virtualization Environments

Figure 2A:
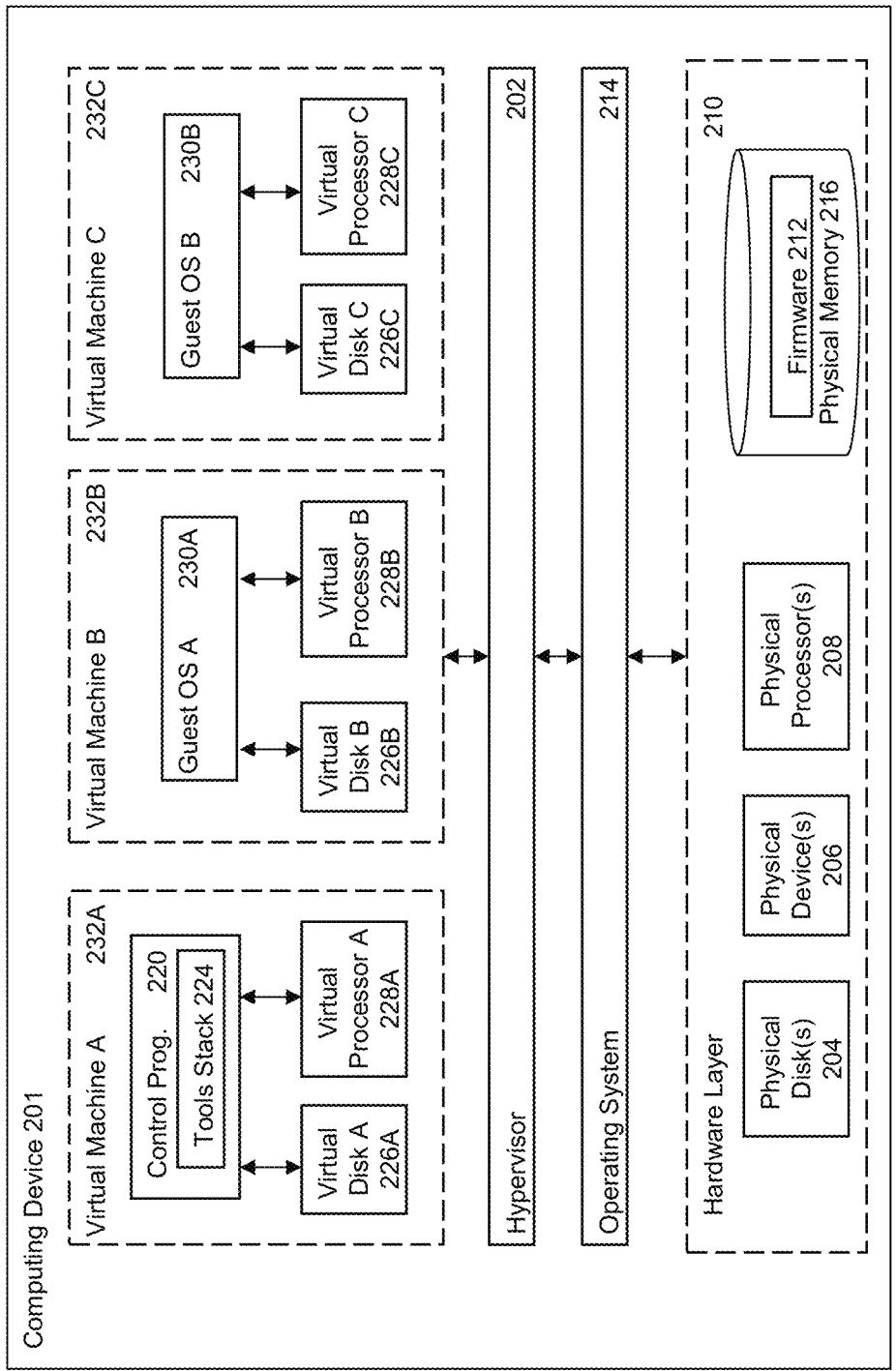
FIGS. 2A and 2B are block diagrams depicting embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein. In various other figures provided herein, a physical device 206 may be shown external to computing device 201, for clarity and without limitation or implication of distinction between internal and external devices.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U or domU. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom0. The control program 220, in some embodiments, can be DOMAIN 0 or DOM0 of the XEN hypervisor. Thus, in some embodiments, control program 220 may be executed within a control virtual machine or dom0 virtual machine, may be executed by the hypervisor, or may be executed by an operating system executing the hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
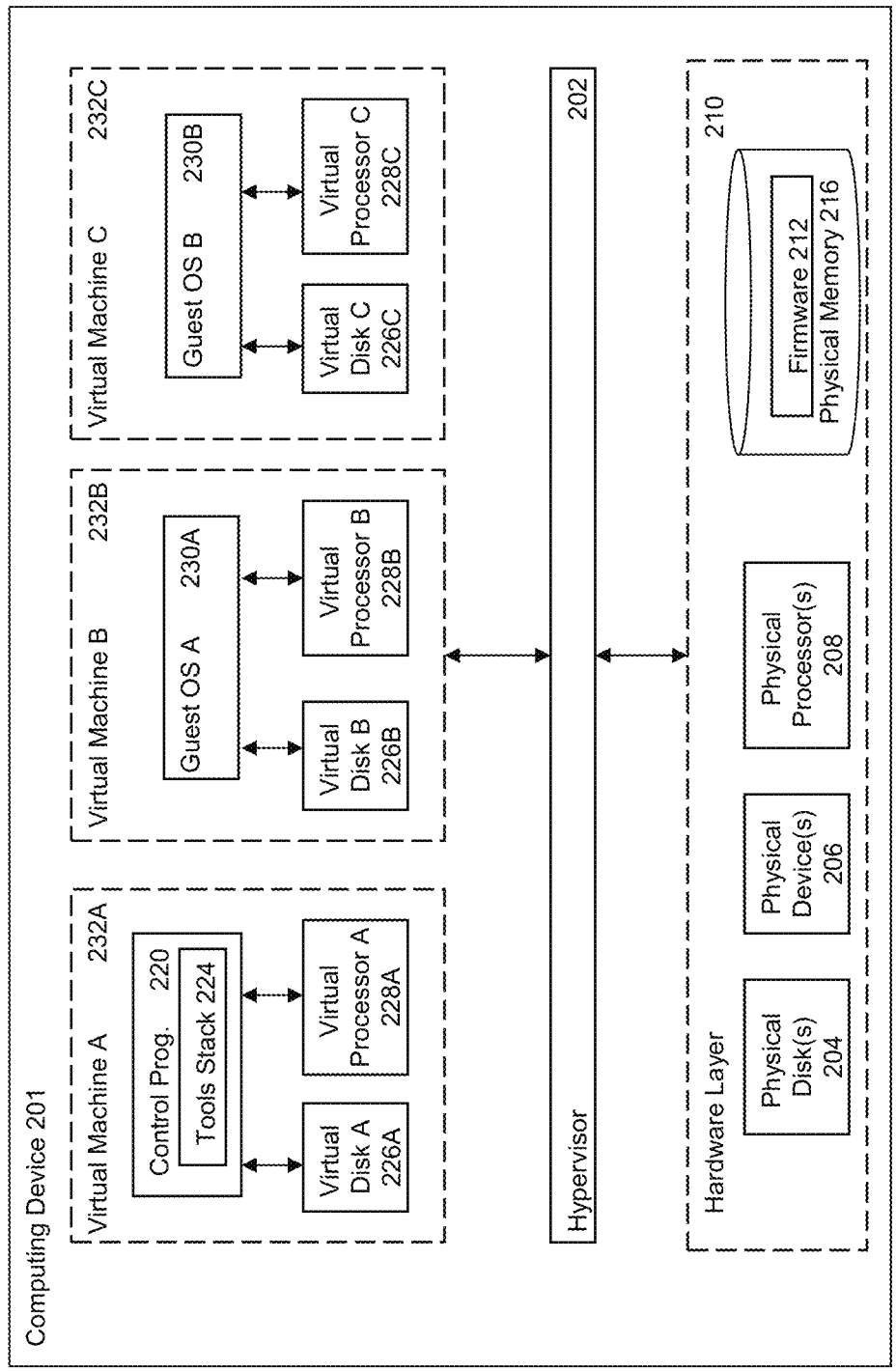

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be a non-trusted virtual machine 232B and/or a trusted virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

Communication between virtual machines may, in some embodiments, be referred to as virtual-to-virtual or V2V technology. This mechanism may provide systems for inter-domain communication between domains running under a hypervisor. In one embodiment, the mechanism includes providing an API (Application Programmers Interface) that can be used in both kernel and user modes. The API can be present in any operating system running as a domain under the hypervisor, including Windows and Linux, or any other operating system. In one embodiment, the V2V API allows two domains or virtual machines to establish a channel of communication. In brief overview, one end of the channel starts as a listening endpoint. The other end can then connect to the listening endpoint. Once the channel is established, the two domains can send messages back and forth on the channel. When either end is finished communicating, it can disconnect the channel and free the associated resources.

In some embodiments, the message passing part of the API can be a low level program that permits any block of data to be sent and received. In some embodiments, V2V provides no transport layer semantics or higher layer functionalities. Thus, in many embodiments and unlike using network interfaces for communicating between virtual machines, messages may not need not be encapsulated with addresses or other headers. In other embodiments, other protocols can be built on top of the V2V API to provide higher level services.

In some embodiments, underlying event channel and shared memory architecture can be used between front end and back end para-virtual driver pairs. V2V, in some embodiments, establishes an API over these driver pairs to make them generic and reusable. V2V may be unique in that it provides a means of communication between domains that is based on the underlying hypervisor functionality. In particular, V2V can use the CITRIX Xen facilities to share memory pages or buffers between domains and the functionality to allow domains to send events to other domains via interrupts.

V2V usage, security and access control can be controlled by components in the control program, or the control program tool stack, discussed above. These systems and methods may be used for communications between two virtual machines, a dom0 or control virtual machine and a domU virtual machine, or any other combination of virtual machines.

C. Maintaining State in a Virtual Machine when Disconnected from Graphics Hardware In an organization such as a corporation, a user may have access to one or more machines for accessing the organization's resources. Some of these machines may execute one or more hypervisors that can manage virtual machines for executing company applications and accessing company resources. With the proliferation of cloud computing and virtualization, a user may have access to one or more virtual machines hosted on a client machine (e.g., assigned to the user), or on a remote server machine (e.g., accessed by multiple users). In some embodiments, for example, a user may simultaneously use one virtual machine for playback of a training video, while using another virtual machine for accessing corporate resources such as an email application. A user may also maintain two workspaces on the user's laptop computer, each workspace provided on a virtual desktop executing on the laptop computer. Accordingly, allocation of limited hardware resources from a host to multiple virtual machines can be quite complex.

The present systems and methods address some of the problems in managing limited host resources, such as graphics hardware, and provides the ability to share a resource between one or more virtual machines while avoiding significant degradation in user experience. For example, a user may run two application sessions from two separate virtual machines with output rendered on a single display. The user may want to redirect focus from a first application session to a second application session. The host machine's graphics hardware may be presently assigned to first virtual machine. In re-assigning the graphics hardware from the first virtual machine to the other virtual machine, a control virtual machine may pause execution of the first virtual machine and save associated state information related to graphics processing. The control virtual machine may seamlessly replace the graphics hardware with an emulator for handling graphics operations, such as memory accesses and interrupts, in connection with the first virtual machine. The emulator may process graphical interactions with the first virtual machine, and may further output or maintain an image for the first virtual machine while a second virtual machine utilizes the graphic hardware. When the first virtual machine regains focus, the graphics hardware may be reallocated back to the first virtual machine. The GPU may then resume graphical processing in place of the emulator for the first virtual machine.

Figure 3A:
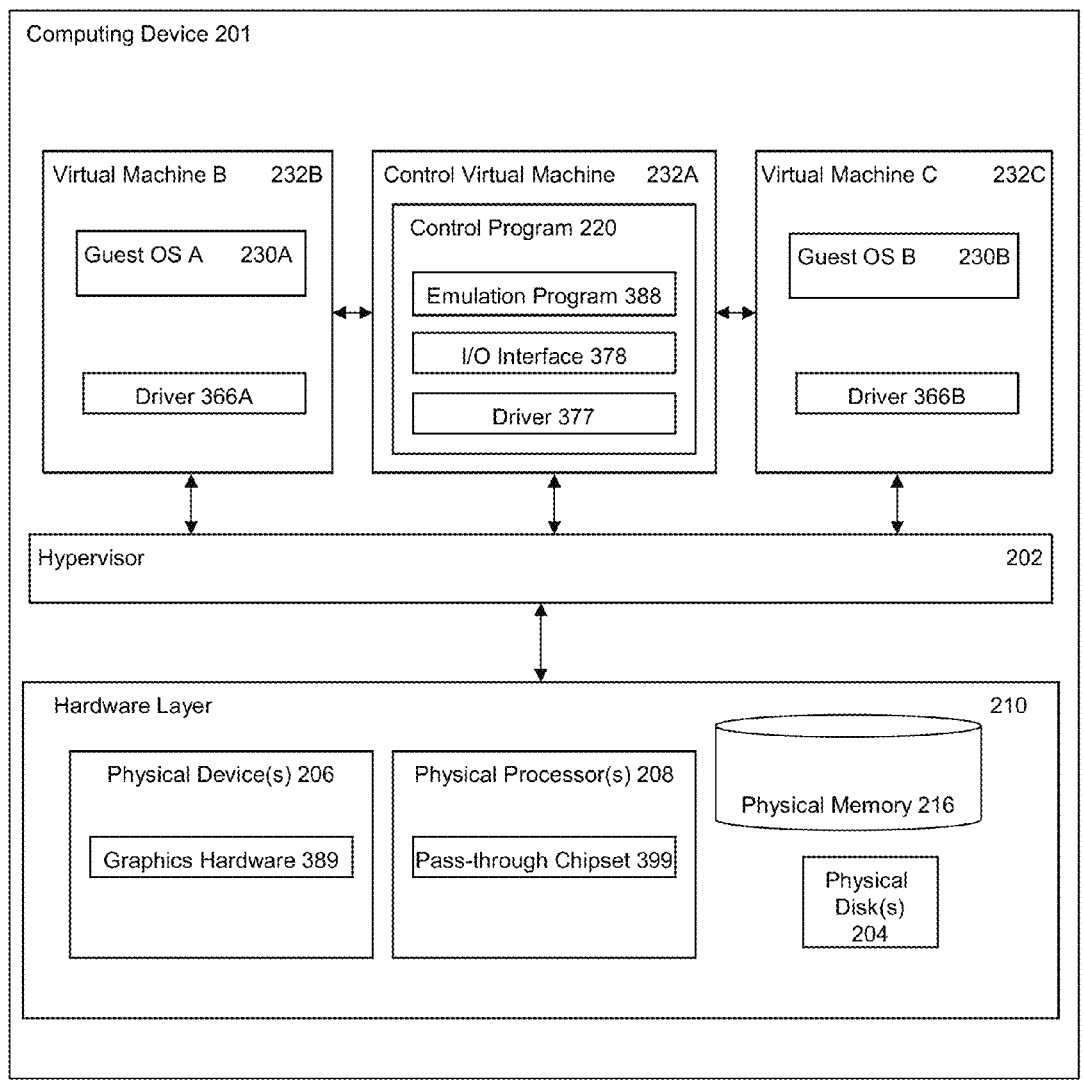
FIG. 3A is a block diagram depicting an embodiment of a system for maintaining state in a virtual machine when disconnected from graphics hardware.

Referring to FIG. 3A, one embodiment of a computing device hosting multiple virtual machines 232 are depicted. The hardware layer 210 may provide resources that can be allocated to and/or shared between several virtual machines. These resources may include processors 206, disks 204, memory 216, and physical devices 206. Physical devices 206 may include graphics hardware 389, such as a video card, graphics acceleration hardware, a frame buffer device, and a graphics processing unit (GPU). Some of these hardware resources may be virtualized, and/or assigned in whole or in part to one or more virtual machines. A dom0 entity, such as a hypervisor or control virtual machine, can have direct access to the hardware resources of the computing device 201. Thus, assignment of hardware resources is typically performed by a dom0 entity, and may be performed dynamically when a need arises, for example, when a virtual machine is first established and allocated hardware resources.

A GPU may sometimes be referred to as a visual processing unit or VPU. A GPU may be designed and/or built to manipulate and alter memory, and accelerate the building of images in a frame buffer intended for output to a display. In a personal computer for example, a GPU can be present on a video card, on a motherboard, or in certain CPUs. A GPU can perform calculations related to computer graphics (e.g., 2D and/or 3D). A GPU can also be used to accelerate the memory-intensive work of texture mapping and rendering polygons, and geometric calculations such as rotation and translation of vertices into different coordinate systems.

In various embodiments, a hypervisor 202, a control virtual machine 232A or a control program 220 can monitor and/or manage virtual machines hosted on the hypervisor, as well as interactions between a user and the virtual machines. The hypervisor, control virtual machine or control program can determine which virtual machine has focus, i.e., is presently active or in use by a user, while other virtual machines are in the background. For example, the hypervisor, control virtual machine or control program can intercept a request initiated from a user or program to determine which virtual machine has focus. The hypervisor, control virtual machine and/or control program are sometimes referred to as Domain 0 or dom0 entities. The hypervisor may host the control virtual machine, as well as one or more virtual machines executing a guest OS. The hypervisor or the control virtual machine may provide a control program, which may execute on a processor of a physical machine hosting the hypervisor. In some embodiments, the control program is a virtualized program executing on a virtual processor of the control virtual machine. By way of illustration and not intended to be limiting in any way, portions of the following discussion may generally reference the control virtual machine 232A as a representative dom0 entity performing various monitoring and management functions. However, the same functions can be performed by another dom0 entity.

A control virtual machine may be configured to monitor or intercept any communication initiated by a user or program via another virtual machine. Such a communication may comprise one or more system calls, hypercalls, interrupts, or other messages. In some embodiments, such a communication may be translated into one or more system calls, hypercalls, interrupts, or other messages. Some of these messages may be passed to the underlying hypervisor or hardware layer for processing. In some embodiments, some or all of the virtual machines 232 are configured to pass all or specific types of communications through the control virtual machine 232A or hypervisor, whereupon the control virtual machine 232A can intercept at least some of these communications. In certain embodiments, virtual machines are configured to send all or specific types of communications to the control virtual machine 232A. In yet other embodiments, the control virtual machine 232A detects or intercepts a communication from a virtual machine as the communication is translated into hypercalls, system calls or interrupts, e.g., for further processing by the hypervisor or hardware layer. A communication may be initiated as, or translated into a V2V communication as described above in connection with section B.

In some embodiments, the control virtual machine includes an input manager. The input manager, in some embodiments, can determine which virtual machine is in focus when an input device is activated. When a particular virtual machine receives focus, a change focus event can be forwarded to the input manager so that the input manager knows whether a virtual machine window has focus. When an input device is actuated, the corresponding driver may issue an event notification, such as a system call or interrupt. The input manager can intercept the system call or interrupt, and usually directs the system call or interrupt to the virtual machine in focus. If a user has a first application with a first window open in a first virtual machine, and a second application with a second window in a second virtual machine, one may expect only one window to have focus, receive mouse and keyboard input, and be foremost in a z-order at any one time.

In some embodiments, a control virtual machine determines which virtual machine is in focus based on a user's most recent interaction(s) with a virtual machine. For a virtual machine in the background, applications may continue to execute, and events can still occur. For example, a WINDOWS MEDIA PLAYER application executing in a background virtual machine may continue to play a video. A virtual machine in the background may receive and/or display an incoming email, e.g., as they routinely or naturally occur. Such situations illustrate that it may be advantageous to allow existing processes to continue to operate within their own virtual machines, regardless of whether their virtual machines are in focus or in the background. This can allow a user to switch focus and multi-task efficiently between virtual machines without significant degradation in user experience.

The systems and methods described herein provide support for maintaining graphical processes across multiple virtual machines. In various embodiments disclosed herein, although a GPU may be referenced by way of illustration, any other form of graphics hardware, such as graphics chip sets, video cards, graphics processing cards, graphics acceleration hardware, frame buffer devices, etc, are also contemplated. In addition, although a control virtual machine is typically referenced as the dom0 entity performing the various operations described in the present systems and methods, any dom0 entity, such as a control program, the hypervisor, a dom0 application or driver, or any combination thereof, can apply.

Referring again to FIG. 3A, the control virtual machine may include an emulation program 388, such as an emulation program for imitating, duplicating, providing or emulating at least some of the functionality of a graphics hardware. In some embodiments, the emulation program is an emulation program that supports functionality from a range of graphics hardware. In other embodiments, the emulation program is designed, built and/or configured to be compatible with at least some features of a specific make, model, and/or version of graphics hardware. Although the emulation program is shown residing in the control virtual machine, in other embodiments, the emulation program may reside and/or execute on the hypervisor, a host OS, and/or another virtual machine. In certain embodiments, the emulation program is selected from a plurality of emulation programs available to the system, which may be stored on disk 204 in the computing device 201.

I/O operations (such as GPU I/O operations) on non-virtualized platforms are generally performed on a hardware device (e.g., GPU). A software stack may interface with the hardware device using some form of memory-mapped I/O (MMIO) mechanism, whereby a processor may issue instructions to read and write specific memory or port address ranges. Such a software stack may comprise a driver executing in an OS of the platform. The values read and written may correspond to direct functions in the hardware device. Emulation, on the other hand, refers to the implementation of at least a portion of hardware in software. In some embodiments, an emulation program may be used in place of hardware without any changes to existing software applications, e.g., a web browser, media player, email application, or word processor. The software application can operate as it did in the native case, and may interact with the emulation program as though it is real hardware. In a virtualization environment, the software application may be unaware that it is communicating to a virtualized device.

In some embodiments, an emulation program may be referred to as an emulator or a device model. The emulation program may comprise an application, program, code or instructions executing on the host OS. During emulation, the control virtual machine may intercept or capture memory calls, such as reads and writes, to an emulation program's address range. In some embodiments, the control virtual machine may map the emulation program's address range to the same address range used by the hardware device. The control virtual machine may, in certain embodiments, assign the address range used by the hardware device to the emulation program. For example, a graphics card driver 366A in the guest OS may write to an address of the graphics card, which the control virtual machine has mapped to an address of the emulation program. As such, the driver can operate as if the driver is still interfacing with the graphics card 389.

The control virtual machine may intercept or capture accesses to the device-discovery space. The control virtual machine may update a configuration of the virtualization environment to expose the emulation program such that it may be discovered by the guest OS and/or software applications. In some embodiments, the control virtual machine may present an emulation program in a PCI configuration space so that the guest OS can "see" the emulation program, and may discover memory addresses that it can use to interact with the emulation program. In certain embodiments, the control virtual machine may update a PCI configuration when replacing a hardware device with a corresponding emulation program. The control virtual machine may update the PCI configuration to directly replace the hardware device with a corresponding emulation program, e.g., without the guest OS and/or software applications realizing that there are two different entities (i.e., the hardware device and the emulation program). For example, the guest OS may identify only one graphics card device (e.g., CREATIVE TECHNOLOGIES SOUNDBLASTER PRO), before, during and after a swap between the actual graphics card and a corresponding emulation program.

In some embodiments, the control virtual machine and/or the emulation program provides a mechanism for injecting interrupts into the guest OS at appropriate times on behalf of the emulated hardware. Such a mechanism may be accomplished by emulating a Programmable Interrupt Controller (PIC). If the guest software communicates a message to the PIC, the message may be captured or intercepted by the emulated PIC. In response to each intercepted communication, the control virtual machine and/or emulation program may model the PIC emulator to substantially match that of an actual PIC. The PIC emulator may operate on behalf of a real PIC to service an interrupt-driven I/O graphics device.

In some embodiments, the emulation program presents an exact interface of a graphics hardware device to a virtual machine, a guest OS and/or an application program executing on the guest OS. In certain embodiments, an emulation program can operate with existing device drivers for a hardware device, and may not require any modification to these device drivers. Although an emulation program may provide lower performance to a virtual machine as compared to physical hardware, a user may find this acceptable, and may not even detect the reduced performance because the virtual machine is operating in the background.

In some embodiments, the emulation program executes in conjunction with a processor and/or other hardware to perform graphics processing. Such a processor may, for example be a central processing unit (CPU), and may not be optimized for performing graphics operations. The emulation program may process system calls, interrupts, event messages, drawings commands (e.g., windowing commands), function or subroutine calls (e.g., openGL library calls), etc, from the guest OS. Responsive to the processing, the emulation program may write or store graphical output in frame buffer memory. The frame buffer may store one or more frames of graphical data. Graphical data may be stored in any form, such as in rasterized, bitmap, or vectorized form. The graphical data may comprise 2D graphics, for example.

In some embodiments, based on the stored graphical data, the frame buffer of the host may update the display of the virtual machine intermittently (e.g., every 30 seconds) or based on some event (e.g., a mouse-over by the user over a window of the virtual machine). In certain embodiments, for example, the frame buffer may store or buffer only the most recent frame of graphical data. In some embodiments, when the graphics hardware is restored to the virtual machine, at least a portion of the stored graphical data is retrieved, processed and/or temporarily rendered via a frame buffer.

In some embodiments, the control virtual machine stores a frame of graphical data from the virtual machine, e.g., the most recent frame generated prior to the graphics hardware being removed from the virtual machine. The control virtual machine or frame buffer (e.g., physical or virtual frame buffer) may maintain this frame for display within the background virtual machine. For example, a window of the background virtual machine may be visible or partially obscured (e.g., via alpha-blending, or partially covered by another window) on a desktop of the user. The image display in the window may create the illusion that graphics in the background virtual machine are being processed without interruption. In certain embodiments, graphical data from the virtual machine is not generated or stored. The control virtual machine or frame buffer may provide a default display for the background virtual machine, e.g., to indicate that the virtual machine is not in focus. Such a default display may include a blank display, a color-coded image, a message to the user, a grayed-out display, an obscured display, a static image, a series of transient images, or any other predefined image(s).

In certain embodiments, the emulation program may provide a front-end interface for the virtual machine, to receive communications from the virtual machine or the guest OS, and/or acknowledge receipt of certain communications. However, the emulation program may perform little or no graphics processing in certain embodiments or scenarios.

In some embodiments, the emulation program comprises a driver 377 and an I/O interface. The emulation program 388 may access or operate with hardware in the hardware layer of the host. Such hardware may, for example, be hardware different from the graphics hardware removed from the virtual machine. The hardware may be a general purpose processor, or may lack some of the features of the removed graphics hardware. In some other embodiments, the emulation program indirectly accesses the removed hardware, even though the removed hardware is no longer dedicated to the virtual machine. This approach of indirect access may be referred to as paravirtualization. In some embodiments, paravirtualization may allow another virtual machine to be directly assigned to the graphics hardware and have direct access to the graphics hardware. Thus, the virtual machine having direct access to the graphics hardware can have access to features such as hardware acceleration.

A paravirtualized driver 377 may be selected for operation in place of an original graphics device driver corresponding to the removed graphics hardware. In some embodiments, the paravirtualized driver 377 is a modified version of the graphics device driver. With paravirtualization, the paravirtualized driver may interact directly with the control virtual machine, for example, at a higher abstraction level than the normal hardware/software interface. The control virtual machine may expose an I/O type-specific API 378, for example, to send and receive packets. The paravirtualized driver executing on the guest OS may then use this I/O interface 378 instead of interacting directly with a hardware device interface.

In some embodiments, instead of using an emulated interrupt mechanism (e.g., emulated PIC), paravirtualization uses an eventing or callback mechanism. Interrupts may be fielded by an Interrupt Service Routine (ISR). The ISR functionality may be provided by a driver 377 or program of the control virtual machine, for example. The ISR may use the I/O interface 378 to receive packets from a paravirtualized driver in the guest OS. The ISR can acknowledge an interrupt and schedule a corresponding worker task. The worker task can then be initiated to handle work associated with the interrupt. The ISR may send event messages to the paravirtualized driver in response to the received packets or interrupts.

In some embodiments, the control virtual machine may interact with another virtual machine, an IO virtual machine (sometimes referred to as "IOVM"), to interface with a guest OS and/or the guest OS' device driver (or paravirtualized driver). The control virtual machine essentially operates as a very thin privileged "micro-hypervisor" that resides just above the physical hardware. One or more IOVMs may operate just above the control virtual machine, each having a driver 377 and an I/O interface 378 like the control virtual machine in the paravirtualized scenario. The IOVM(s) may be responsible for I/O processing and I/O resource sharing. By way of illustration, a graphics device can be allocated to a service VMs (i.e., the IOVM) specialized for the specific I/O function. In some embodiments, the IOVM setup allows for the use of unmodified device drivers 377 within the IOVM. In some of these embodiments, the IOVM, with its access to virtualized graphics hardware, may be viewed as a graphics emulator.

In some embodiments, it may be desirable for a graphics hardware to be directly owned and accessed by a particular guest VM, e.g., by direct assignment. Direct assignment provides a native experience for the virtual machine, because the virtual machine can use existing device drivers to talk directly to the graphics device. As mentioned above, a virtual machine having direct access to a graphics card can leverage on hardware acceleration to process images. However, the control virtual machine may only be able to directly assign as many graphics devices as are physically available on the host. Direct assignment can improve performance over emulation by allowing the device driver to talk to the graphics device in its native hardware command format, and can eliminate the overhead of translating from the command format of a virtual or emulated device.

In some embodiments, graphics hardware may be directly assigned to a virtual machine using direct mapping techniques, such as Virtualization Technology for Directed I/O (VT-d) and AMD's I/O Virtualization Technology (AMD-Vi). Such techniques may use an input/output memory management unit (IOMMU) to enable a virtual machine to directly use graphics cards through direct memory access (DMA) and interrupt remapping. This is sometimes called PCI passthrough. In some embodiments, DMA remapping refers to address translations for device DMA data transfers. As an example of DMA remapping, IOMMUs can be implemented in PCI root bridges to provide DMA addressability. Other examples of DMA remapping techniques and facilities may include the AGP Graphics Aperture Remapping Table (GART), the Translation and Protection Table (TPT) defined in the Virtual Interface Architecture, the InfiniBand Architecture, and Remote DMA (RDMA) over TCP/IP specifications.

In some embodiments, the host computing device includes pass-through facilities 399 for supporting direct mapping. Although FIG. 3A depicts the pass-through tools as a chipset, in other embodiments any other form of hardware, or combination of hardware and software may be employed to provide direct mapping features. In some embodiments, "pass-though" refers to a virtual machine or guest OS' direct mapping or access to an I/O device (e.g., video card). For example, VT-d hardware may treat an address specified in a DMA request as a DMA virtual address (DVA). A DVA may be the Guest Physical Address (GPA) of the virtual machine to which a graphics hardware is assigned, or some software-abstracted virtual I/O address. Pass-through hardware may transform the address in a DMA request issued by the graphics hardware to its corresponding Host Physical Address (HPA).

When a virtual machine's device driver instructs a graphics device to perform a data transfer, the device driver may use the guest OS' physical addresses. The graphics hardware, however, may be accessing system memory using host physical addresses. In order to deal with this address space mismatch, a control virtual machine that supports direct assignment may provide and/or execute a pass-through driver. The pass-through driver may intercept communications between the virtual machine device driver and the graphics hardware. Upon intercepting messages that refer to physical addresses (e.g., in the messages' command arguments), the pass-through driver may perform translation between the guest OS' physical address space and the host's real physical address space. Pass-through drivers may be device-specific since they decode the command format for a specific hardware device to perform the necessary translations.

In some embodiments, interrupt remapping may refer to the remapping of device-generated interrupts in the form of DMA rewrite requests. In some embodiments, interrupt remapping can be implemented so as to provide virtual machine routing and isolation of device interrupts. The control virtual machine may control the interrupt requests generated by a graphics hardware to ensure proper device isolation in a virtualized system. In some embodiments, platform interrupts are fielded by the control virtual machine since the control virtual machine manages the rest of the physical platform. These interrupts may be routed by the control virtual machine to the appropriate virtual machine, i.e., the virtual machine assigned with the physical graphics device.

By way of illustration, in some INTEL platforms, a graphics device may generate either a legacy interrupt (e.g., which is routed through I/O interrupt controllers) or may issue a message signaled interrupt (MSI). MSIs may be issued as DMA write transactions to a pre-defined architectural address range. Interrupt attributes, such as vector, destination processor, delivery mode, etc, may be encoded in the address and data of the write request. In some embodiments, DMA write requests identified as interrupt requests by a graphics hardware are subject to interrupt remapping. The requestor-id of each interrupt request may be remapped through a table structure. For example and in some embodiments, each entry in the interrupt-remapping table may correspond to a unique interrupt message identifier from a graphics device and may include the necessary interrupt attributes (e.g., destination processor, vector, delivery mode, etc). This architecture can support remapping of interrupt messages from different sources including I/O interrupt controllers (IOAPICs), and various types of MSI and MSI-X interrupts, e.g., interrupts defined in PCI specifications.

By way of illustration, the VT-d interrupt-remapping architecture uses a particular interrupt-message format. The interrupt message may be in the form of a DMA write request, but the write request itself may include a "message identifier" and not the actual interrupt attributes. The write request, like a DMA request, may specify the requester-id of the hardware function generating the interrupt.

Figure 3B:
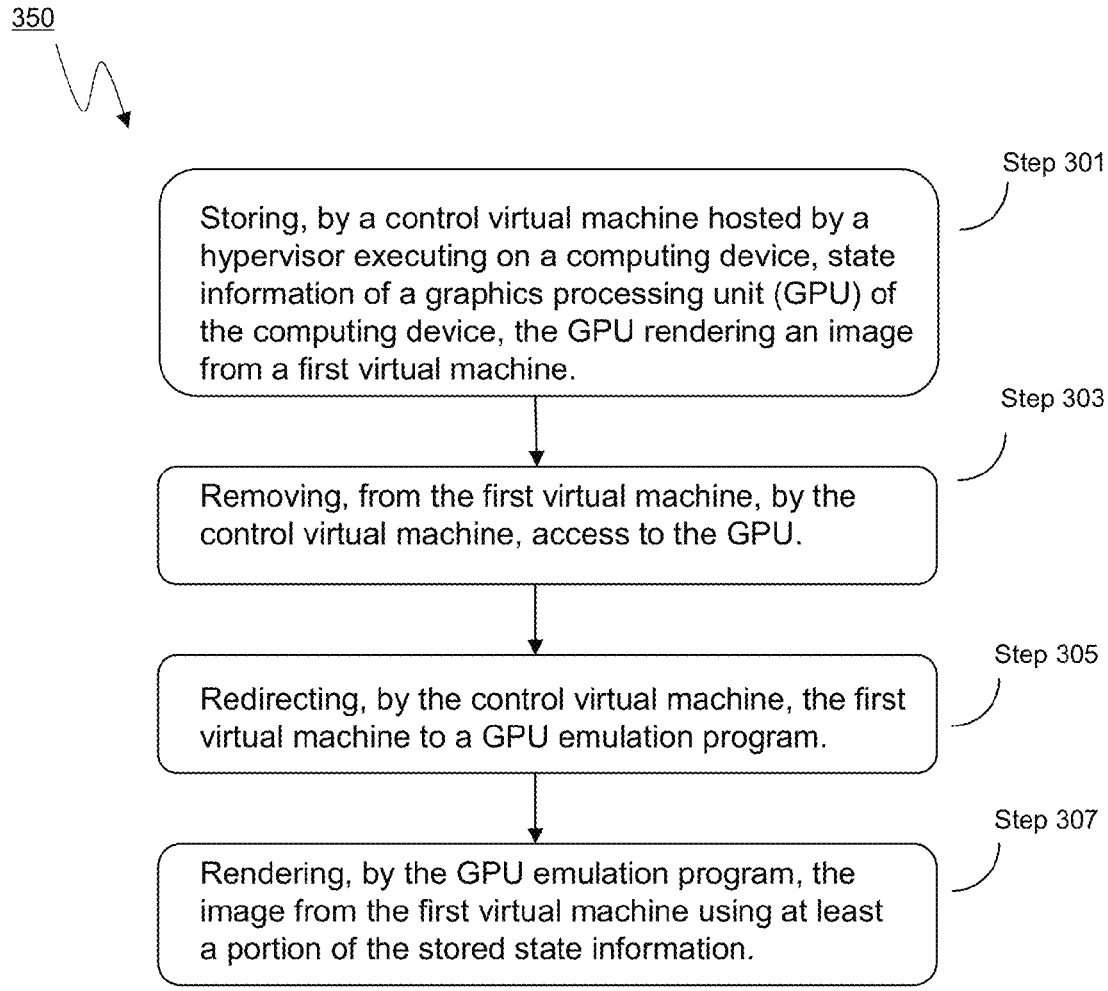
FIG. 3B is a flow diagram of an embodiment of a method for maintaining state in a virtual machine when disconnected from graphics hardware.

Illustrated in FIG. 3B is one embodiment of a method for maintaining state in a virtual machine when disconnected from graphics hardware. The virtual machine may be one of a plurality of virtual machines hosted by a hypervisor executing on a computing device. A control virtual machine may be hosted by a hypervisor executing on a computing device. The control virtual machine may store state information of a graphics processing unit (GPU) of the computing device (Step 301). The GPU may render an image from a first virtual machine. The control virtual machine may remove, from the first virtual machine, access to the GPU (Step 303). The control virtual machine may redirect the first virtual machine to a GPU emulation program (Step 305). The GPU emulation program may render the image from the first virtual machine using at least a portion of the stored state information (Step 307).

Further referring to FIG. 3B, and in more detail, a control virtual machine hosted by a hypervisor executing on a computing device may store state information of a graphics processing unit (GPU) of the computing device (Step 301). The GPU may render an image from a first virtual machine. The control virtual machine may copy and/or store state information of the GPU to a buffer. For example, this may be a buffer of the virtual machine to which the GPU is assigned, a buffer of the control virtual machine, or the host computing device's memory. The control virtual machine may copy and/or store the state information in preparation to pause or stop operation of the GPU for the virtual machine. The control virtual machine may copy and/or store the state information in preparation to re-assign the GPU to another virtual machine.

Prior to copying or storing the state information, the GPU may be processing and/or rendering an image from the virtual machine to which the GPU is assigned. The GPU may be processing function calls, system calls or other messages from the virtual machine. The GPU may be processing GDI calls, X Windows commands or other messages associated with the rendering of graphical output from an application or guest OS executing in the virtual machine. For example, these messages may include graphics drawing commands (e.g., geometric commands, or commands to create or size windows and widgets), which may be sent to the GPU in raw form. In some embodiments, these messages include presentation level components, for example ICA or RDP presentation level components.

In some embodiments, these messages may include event messages and/or commands such as system calls and ioctl calls. These can include, for example, commands to open (e.g., to open a named graphics device), close (e.g., to close an graphics device), write (e.g., to write into a buffer), etc. Commands and graphics-related information in various formats (e.g., window and widget creation commands, vector commands, etc) and supporting various platforms (e.g., MS WINDOWS, LINUX) are contemplated. In addition, these messages may include low level messages (e.g., system calls) as well as higher level representations of graphics (e.g., bmp, jpeg formats). In some embodiments, administrative function calls (e.g., write) may include a segment of graphics data in the call, or reference a segment of graphics data for retrieval.

Various embodiments of the graphics-related messages may be generally referred to as graphics calls or function calls. By way of illustration, an application executing in the first virtual machine, e.g., APPLE QUICKTIME player, may generate one or more graphics calls. The application may transmit the graphics calls to a driver 366 executing on a guest OS of the virtual machine. The driver may modify the graphics calls and transmit the modified graphics calls to the hypervisor (e.g., as a hypercall), the control virtual machine, or a driver executing on the host OS of the computing device. In some embodiments, the control virtual machine intercepts the modified graphics calls. The control virtual machine, driver 377 or the hypervisor may direct the modified graphics calls to the GPU 389. The GPU may receive and process the modified graphics calls for rendering by an output device.

In some embodiments, the control virtual machine may determine that a second virtual machine requires access to the GPU. For example, an graphics application in the second virtual machine may begin to stream and/or buffer high quality video. The control virtual machine may detect that a user has initiated graphical operations for the second virtual machine. For example, the control virtual machine may determine that the second virtual machine is being configured to deliver high definition video. The control virtual machine may decide to assign the GPU to the second virtual machine for any reason, such as to support hardware acceleration and/or high quality rendering of graphics.

In some embodiments, the control virtual machine may determine that the second virtual machine is assigned a higher preference or priority over the first virtual machine for access to the GPU. In certain embodiments, the control virtual machine may determine that there has been too few or no graphics calls from the first virtual machine over a period of time. The control virtual machine may determine that the second virtual machine presently has a greater need for the GPU. In some cases, the control virtual machine may determine that the second virtual machine presently has focus, while the first virtual machine is in the background.

In certain embodiments, the control virtual machine may determine to re-allocate or directly assign the GPU from the first virtual machine to the second virtual machine. The control virtual machine may determine that graphics operations in the second virtual machine is more critical than that in the first virtual machine. The re-allocation may require removing or de-allocating the GPU from the first virtual machine. In some embodiments, the control virtual machine may pause, halt or stop operation of at least a portion of the first virtual machine. For example, the control virtual machine may pause execution of an application providing graphics calls to the guest OS or GPU driver. The control virtual machine may pause execution of the guest OS component or GPU driver handling graphics calls. The control virtual machine may pause execution of the GPU and/or frame buffer in the processing and/or rendering of graphics.

The control virtual machine may pause operation in each of these components in response to completion of a particular graphics call. The particular graphics call may be identified from a queue of graphics calls. In some embodiments, the control virtual machine may identify a function, subroutine, or a particular instruction step or instruction set to complete before halting further operations. For example, the control virtual machine may instruct a CPU of the host to stop issuing memory requests to the graphics hardware or GPU. The control virtual machine may instruct a PIC to halt processing of interrupts.

In some embodiments, the control virtual machine may buffer graphics calls, for example at the guest OS level, so that downstream components (e.g., GPU) may halt operation. The control virtual machine may halt graphical output from a frame buffer to a display device. In some embodiments, the control virtual machine may instruct the frame buffer to maintain a particular graphics frame for rendering by the display device. The control virtual machine may determine a suitable instant to pause operation such that state information can be stored properly and/or efficiently. The control virtual machine may determine a suitable instant to pause operation such that state information may be restored and/or resumed properly and/or efficiently. In some embodiments, a portion of the application programs, guest OS, drivers and/or graphics hardware may enter hibernation or sleep mode.

Responsive to pausing operation, the control virtual machine may copy, save and/or store state information associated with the graphics operations. In certain embodiments, the control virtual machine may copy, save and/or store state information associated with the GPU and/or the first virtual machine. For example, the control virtual machine may save a graphics stack, the state of one or more drivers (e.g., hardware or graphics drivers), graphics calls intercepted or queued for the GPU, GPU output to an output device, and/or buffered graphics content in a frame buffer. In some embodiments, a graphics stack may comprise a software stack of programs and/or drivers executing in the guest OS and/or as firmware within the graphics hardware. The graphics stack may include one or more configurations, settings and/or properties associated with an application generating graphics calls, the guest OS, graphics drivers and/or graphics hardware. Thus, copying or saving a state of the graphics stack may include copying or saving a state of a driver. Saving a state of the graphics stack may include saving a value maintained in a register or memory at a particular instant. In some embodiments, the graphics stack includes graphics calls, intermediary data from graphics processing and/or graphical data output by the graphics hardware.

The control virtual machine may save the state information in a buffer or memory. The control virtual machine may save different components of the state information to various locations, such as cache, memory, disk storage, registers, etc. A portion of the state information may be stored locally within the context of first virtual machine, within dom0, and/or in host memory 216. In some embodiments, the control virtual machine directs at least a portion of the state information to an emulation program.

In some embodiments, prior to pausing operations, storing state information and/or removing the GPU from the first virtual machine, the control virtual machine may determine if a suitable emulation program is available. In some other embodiments, the control virtual machine may determine if a suitable emulation program is available while pausing operations and/or storing state information. The control virtual machine may determine that a GPU emulation program is available within the first virtual machine for execution. The control virtual machine may determine that the GPU emulation program is installed in the computing device. The control virtual machine may determine that a GPU emulation program is available for execution by the control virtual machine, the hypervisor, or on a host OS. The control virtual machine may select the emulation program from a plurality of emulation programs. The control virtual machine may select the emulation program based on the make, version and/or configuration of the GPU. The control virtual machine may select a paravirtualization or IOVM technique, as described above in connection with FIG. 3A, to implement the emulation. In certain embodiments, the control virtual machine may initiate execution of the GPU emulation program prior to removing access to the GPU.

The control virtual machine may remove, from the first virtual machine, access to the GPU (Step 303). The control virtual machine may de-allocate the GPU from the first virtual machine. The control virtual machine may re-allocate the address space of the GPU to the emulation program. The control virtual machine may allocate a new address space for the GPU to access. Accordingly, the guest OS of the first virtual machine may continue to submit memory calls to the same address space for processing by the emulation program in place of the GPU. In some embodiments, the control virtual machine allocates an address space to the emulation program and remaps the guest OS to access this address space instead of that allocated to the GPU. In some embodiments, address spaces may include memory and/or port address ranges. In certain embodiments, the memory allocation and/or mapping may be configured by updating a memory map, such as a memory map between addresses in the context of the guest OS and addresses in the context of the control virtual machine, emulation program or GPU.

In some embodiments, the control virtual machine remaps the emulation program in place of the GPU. The control virtual machine may place or map the emulation program into the same PCI configuration space as the removed GPU. The control virtual machine may update the PCI configuration of the emulation program to match that of the outgoing GPU. In some embodiments, the control virtual machine may disable a PIC operating in conjunction with the GPU. The control virtual machine may replace the PIC with a PIC model, such as an emulated PIC and/or a virtual device. The control virtual machine may configure the PIC model, or select a PIC model, so that it interfaces with the guest OS 230 and device driver 366 in substantially the same manner as the original PIC. In some embodiments, the control virtual machine may remove a GPU with a frame buffer device, video card or other graphics hardware. The control virtual machine or the emulation program may provide a virtual frame buffer for storing graphics frames.

In some embodiments, the control virtual machine removes a direct assignment of the GPU to the first virtual machine. A direct mapping facility, such as a VT-d chipset, may have supported direct assignment of the GPU to the virtual machine. When direct assignment of the GPU is removed, the emulation program may be configured to provide or imitate some features of a corresponding direct mapping facility. For example, the emulation program may emulate the DMA remapping or IOMMU features of VT-d. The emulation program may perform address translation and/or interrupt remapping according to VT-d or another direct mapping scheme.

In some embodiments, the control virtual machine may remove the GPU from the virtual machine by direct assignment to another virtual machine. For example, the control virtual machine may send instructions to the VT-d chipset or other direct mapping facility to remove the GPU from a first virtual machine and/or map the GPU to a second virtual machine. The control virtual machine may perform this when graphics operations have paused. In some embodiments, the direct mapping facility pauses at least a portion of existing graphics operations before remapping the GPU to another virtual machine.

The control virtual machine may redirect the first virtual machine to a GPU emulation program (Step 305). In some embodiments, the control virtual machine may redirect the first virtual machine to the emulation program at substantially the same time as removing the GPU from the first virtual machine. Accordingly, one or more operations described above in connection with Step 303 may occur in parallel with Step 305, e.g., in a coordinated fashion as managed by the control virtual machine. By way of illustration, the control virtual machine may systematically re-allocate the address space of the GPU to the emulation program while graphics operations are paused. The control virtual machine may allocate an address space to the emulation program and instruct the guest OS to access this address space instead of that allocated to the GPU. The control virtual machine may place or map the emulation program into the same PCI configuration space as the removed GPU. The control virtual machine may replace a PIC with a PIC model in some embodiments. The control virtual machine or the emulation program may provide a virtual frame buffer for storing graphics frames.

In some embodiments, the control virtual machine initiates a paravirtualized driver in the guest OS to interface with an I/O-type API 378 of the control virtual machine, e.g., for indirect access to a portion of the GPU. The control virtual machine may provide an interrupt service routine to handle interrupts. Using the paravirtualization technique, the control virtual machine may virtualize and allocate a portion of the GPU to a virtual machine.

In some embodiments, the emulation program is configured to have the same device type as the GPU, for example as seen by the guest OS. The control virtual machine may initiate execution of the emulator such that it does not trigger a discovery by the device manager as a new device. The control virtual machine may pause operation of a device manager of the guest OS, and replace the GPU with the emulation program so that the device manager detects no change in the number and/or types of devices detected by the guest OS. Similarly, the device manager may detects no change in the number and/or types of devices detected by the guest OS when the GPU is removed. For example, the guest OS may fail to detect the lost of the GPU and/or the transition to the emulation program. Thus, the guest OS may fail to generate or issue a "hardware removed unexpectedly" error, or a "new hardware detected" warning or alert.

In some embodiments, the control virtual machine may identify or intercept graphics calls from the first virtual machine, and may redirect these graphics calls to the emulation program. For example and in one embodiment, the control virtual machine may switch a queue of graphics calls, from the graphics card to the emulation program, for processing. In some embodiments, the control virtual machine may reconfigure device mapping from the graphics card to the emulation program. For example, the control virtual machine may add the emulation program as a "hardware" or virtual hardware in the first virtual machine, and replace the mapping from the graphics card to the emulation program.

The control virtual machine may modify a destination of a graphics call, originally destined for the graphics cards, to the emulation program instead. In some embodiments, the control virtual machine operates as a switch or conduit to channel communications from the first virtual machine to the emulation program, instead of to the graphics card.

In some embodiments, the control virtual machine intercepts graphics calls to the GPU and redirects these graphics calls to both the GPU and the emulation program. The control virtual machine may configure the emulation program as a redundant processing unit of the GPU for a short period of time. The control virtual machine may test or evaluate the emulation program for compatibility. The control virtual machine may intercept and/or discard the output from the GPU. The control virtual machine may remove the GPU from the redundancy configuration, or replace the GPU with the emulation program, once the emulation program is operating properly. In some embodiments, the control virtual machine and/or guest OS redirects an application of the first virtual machine to the GPU emulation program. The application may provide a image, and may generate graphics calls that specify the image. The guest OS and/or the control virtual machine may direct a graphics call to the emulation program, e.g., by device memory mapping and memory calls.

The control virtual machine may perform the redirection in a seamless or substantially seamless manner. For example, it may appear to the first virtual machine that the original graphics hardware corresponding to the graphics card had not been removed or changed. In some embodiments, the first virtual machine may detect a change in graphics device or graphics configuration but that there is continuity in graphics processing or support. In some embodiments, the first guest OS of the first virtual machine does not issue an interrupt or an error during the redirection or transition. In some embodiments, the control virtual machine provides the first virtual machine with uninterrupted or substantially uninterrupted access to a graphics processing entity during the removal and redirection. The control virtual machine may replace the GPU seamlessly with the emulation program. The emulation program may provide the same or substantially the same interfaces to the guest OS and virtual machine as the GPU. In certain embodiments, by pausing at least some operations (e.g., graphics operations) within the virtual machine, the control virtual machine can transition out the GPU, and can transition in the emulation program without significantly impacting user experience, or causing any operational glitches.

The GPU emulation program may render the image from the first virtual machine using at least a portion of the stored state information (Step 307). In some embodiments, the control virtual machine may retrieve an image from the stored state information. For example, the control virtual machine may retrieve an image copied from the frame buffer. The image may be stored with the state information and can be retrieved for rendering to a display. The control virtual machine may send the image to the GPU, for processing with other images for display to a user. For example, the image may be a static image of a window of the first virtual machine. The image may be an image saved from the first virtual machine when graphics operations were paused, or when the GPU was removed. The emulation program or a GPU may render the image as a representation of a virtual machine operating in the background. The image may be partially obscured or alpha-blended within a display of a desktop, for example.

In certain embodiments, the image is a default image representing a virtual machine operating in the background. The emulation program may use a portion of the stored state information to render the image. In some embodiments, the emulation program retrieves a portion of the state information to build an image for rendering. For example, the stored state information may include graphics calls that the emulation program can process into an image. In some embodiments, the control virtual machine or emulation program may maintain the same image for the virtual machine while operating in the background In some embodiments, the control virtual machine may configure the emulation program, the emulated PIC and/or a virtual frame buffer using at least a portion of the stored state information. The control virtual machine may use a state of the GPU to configure the emulation program so that graphics processing may resume from that state. The control virtual machine may map a state of the GPU to the emulation program so that there is real or perceived continuity in graphics processing after the GPU has been swapped with the emulation program. In some embodiments, a portion of the stored graphics stack, such as a state of a driver, may be configured into a corresponding paravirtualized driver. A state of a PIC may be mapped into an emulated PIC. The control virtual machine may restore a portion of configurations, settings and properties from the stored graphics stack to establish a graphics stack in support of the emulation program.

The control virtual machine may provide, to a second virtual machine, access to the GPU responsive to the removal. Responsive to the removal of the GPU from the first virtual machine, the control virtual machine may make the GPU available for discovery by the second virtual machine's guest OS. In some embodiments, the control virtual machine maintains an emulation program or a placeholder in each virtual machine so that a GPU can be replaced in without causing a "new hardware detected" alert.

In certain embodiments, the GPU may move, or be re-allocated from virtual machine to virtual machine. For example. the move may be based on graphics processing needs, or occur when a different virtual machine receives focus. The control virtual machine may pause a portion of the graphics stack, the guest OS, one or more drivers, and/or an application issuing graphics calls as described above. The control virtual machine may store state information and may replace the GPU with an emulation program. Following the removal of the GPU from the virtual machine, the GPU may be re-allocated to another virtual machine. In some embodiments, the control virtual machine may restore a GPU to a virtual machine (e.g., first virtual machine) mapped to an emulation program. The control virtual machine may restore a portion of stored state information to the GPU and redirect the first virtual machine from the emulation program to the GPU. The process of re-allocating or moving resources such as a GPU between virtual machines may be referred to as "sliding".

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of these methods and systems, it will now become apparent to one of skill in the art that other embodiments incorporating the concepts of the disclosure may be used.

We claim:

1. In a computing device executing a hypervisor hosting a plurality of virtual machines, a method for maintaining state in one or more of the plurality of virtual machines when disconnected from graphics hardware, comprising:
   (a) storing, by a control virtual machine hosted by the hypervisor executing on the computing device, state information of a graphics processing unit (GPU) of the computing device, the GPU rendering an image from a first virtual machine of the plurality of virtual machines;
   (b) removing, from the first virtual machine, by the control virtual machine, access to the GPU;
   (c) redirecting, by the control virtual machine, the first virtual machine to a GPU emulation program; and
   (d) rendering, by the GPU emulation program, the image from the first virtual machine using at least a portion of the stored state information.

2. The method of claim 1, wherein (a) comprises storing state information of the GPU to a buffer of the computing device.

3. The method of claim 1, wherein (a) comprises copying at least a portion of a graphics stack of the GPU including a state of a graphics driver.

4. The method of claim 1, further comprising determining, by the control virtual machine, that the GPU emulation program is available within the first virtual machine for execution.

5. The method of claim 1, further comprising determining, by the control virtual machine, that the GPU emulation program is installed in the computing device.

6. The method of claim 1, further comprising executing the GPU emulation program prior to removing access to the GPU.

7. The method of claim 1, wherein the control virtual machine provides the first virtual machine with uninterrupted access to a graphics processing entity during the removal and redirection.

8. The method of claim 1, wherein (c) comprises redirecting an application of the first virtual machine providing the image to the GPU emulation program.

9. The method of claim 1, further comprising providing, by the control virtual machine, to a second virtual machine, access to the GPU responsive to the removal.

10. The method of claim 1, further comprising restoring the stored state information to the GPU and redirecting the first virtual machine to the GPU.

11. In a computing device executing a hypervisor hosting a plurality of virtual machines, a system for maintaining state in one or more virtual machines of the plurality of virtual machines when disconnected from graphics hardware, comprising:
   the hypervisor executing on the computing device and hosting a control virtual machine and a first virtual machine, wherein the control virtual machine is configured to:
      store state information of a graphics processing unit (GPU) of the computing device, the GPU rendering an image from the first virtual machine;
      remove, from the first virtual machine, access to the GPU; and redirecting the first virtual machine to a GPU emulation program,
      wherein the GPU emulation program renders the image from the first virtual machine using at least a portion of the stored state information.

12. The system of claim 11, wherein the control virtual machine stores state information of the GPU to a buffer of the computing device.

13. The system of claim 11, wherein the control virtual machine copies at least a portion of a graphics stack of the GPU including a state of a graphics driver.

14. The system of claim 11, wherein the control virtual machine determines that the GPU emulation program is available within the first virtual machine for execution.

15. The system of claim 11, wherein the control virtual machine determines that the GPU emulation program is installed in the computing device.

16. The system of claim 11, wherein the control virtual machine initiates execution of the GPU emulation program prior to removing access to the GPU.

17. The system of claim 11, wherein the control virtual machine provides the first virtual machine with uninterrupted access to a graphics processing entity during the removal and redirection.

18. The system of claim 11, wherein the control virtual machine redirects an application of the first virtual machine providing the image to the GPU emulation program.

19. The system of claim 11, wherein the control virtual machine provides, to a second virtual machine, access to the GPU responsive to the removal.

20. The system of claim 11, wherein the control virtual machine restores the stored state information to the GPU and redirects the first virtual machine to the GPU.

* * * * *